Patented Aug. 5, 1947

2,425,286

UNITED STATES PATENT OFFICE 2,425,286

AZO GUANAMINES

Jack Theo Thurston, Cos Cob, and Donald William Kaiser, Stamford, Conn., assignors to American Cyanamid Company, New York, N. Y., a corporation of Maine No Drawing. Application August 30, 1941, Serial No. 409,148

1 Claim. (Cl. 260—153)

This invention relates to guanamines having one or more azo groups.

A number of guanamines have been prepared with various substituents on the 2-carbon atom of the triazine ring and some of these guanamines have achieved practical importance as intermediates for the preparation of synthetic resins by condensation with formaldehyde or similar aldehydes. Such resins are colorless or substantially so, and where a colored resinous material is desired, it is necessary to incorporate pigments of various kinds. There is a considerable demand for synthetic resins having colored molecules so that the resin itself is colored for use in coating compositions, plastics pigments, and the like.

When guanamines are prepared with a substituent either on the 2-carbon atom of the triazine ring, or on one of the amino groups attached to the 4- or 6-carbon atom of the ring, it is possible to form azo dyes either by diazotizing the amino-substituted guanamines and coupling with a suitable coupling component such as phenols, hydroxy carboxylic acid, and the like, or by producing substituted guanamines having substituents with groups capable of conversion into radicals suitable for azoic coupling with diazotized amines. These azo guanamines are coloring matters of various shades and can be formed into resins which are themselves colored.

Coloring matters of the present invention include the guanamine radical, that is to say, a 4,6-diamino triazine with a substituent containing an azo group. This substituent will in general be an arylazoaromatic group in which the aromatic portion of the group may be either carbocyclic or heterocyclic. The industrially attractive compounds are those in which the substituent containing the azo group is on the 2-carbon atom of the triazine ring and can be represented by the formula R—G in which R is an arylazoaromatic group as above and G is a guanamine radical having a free valence on the 2-carbon atom of the triazine ring, the bond being a carbon-to-carbon bond.

The present invention broadly is not limited to any particular methods of forming the azo coloring matters, the ordinary methods of diazotization and coupling being applicable, insofar as the solubility of the compound permits. Some of the guanamines are not sufficiently soluble in water or aqueous alkali and require reaction in a suitable organic medium. This is an advantage of the present invention as the color chemist does not have to learn any basically new techniques.

The invention will be described in greater detail in conjunction with the following specific examples which are typical illustrations. The parts are by weight.

Example 1

2-hydroxybenzoguanamine-5-azobenzene-4'-sulfonic acid

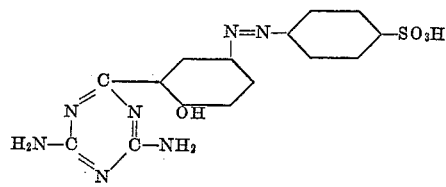

10.15 parts of 2-hydroxybenzoguanamine prepared by reacting methyl salicylate with biguanide, dissolved in 120 parts of 60% methanol containing 6 parts of sodium hydroxide, was added to the diazonium salt made from 8.65 parts of sulfanilic acid. The reaction was kept cold until complete and then the reaction mixture was acidified with acetic acid to set free the dye which was filtered and washed, some difficulty being encountered in washing due to occlusion of salts. The dye melted above 326° C. and was of a light tan color. Weight yield exceeded the theoretical due to the fact that a certain amount of the occluded inorganic salts were not completely washed out but their presence does not interfere with the use of the dyestuff.

Example 2

3-hydroxy-2-naphthoguanamine-4-azobenzene

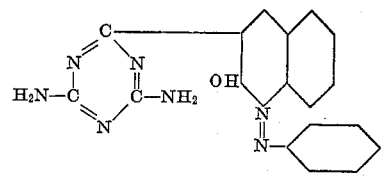

20 parts of 3-hydroxy-2-naphthoguanamine prepared by the reaction of the methyl ester of beta-oxy naphthoic acid with biguanide was dissolved in 120 parts of the ethyl ether of ethylene glycol to which 12 parts of 12N sodium hydroxide had been added. This strongly alkaline solution with good stirring was gradually added to a cold solution of benzene diazonium chloride derived from 7½ parts of aniline. After the reaction was complete the dye was set free by acidification with acetic acid, filtered, and washed. The washing was not entirely complete as inorganic salts were occluded. The product was then dried and finally pulverized. Slightly better than the theoretical weight yield of a deep red product melting at 213° C. was obtained.

Example 3

3-hydroxy-2-naphthoguanamine-4-azobenzene-4'-sulfonic acid

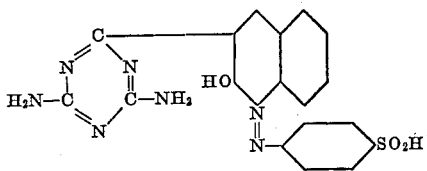

The procedure of Example 2 was followed except that instead of 7½ parts of aniline, 13.8 parts of sulfanilic acid was used. Substantially theoretical yields were obtained of a dark red powder melting with decomposition at 312° C.

We claim:
2-hydroxybenzoguanamine - 5 - azobenzene-4'-sulfonic acid.

JACK THEO THURSTON.
DONALD WILLIAM KAISER.

REFERENCES CITED

The following references are of record in the file of this patent:

UNITED STATES PATENTS

| Number | Name | Date |
|---|---|---|
| 2,258,977 | Dickey | Oct. 14, 1941 |
| 2,155,001 | Schmid | Apr. 18, 1939 |
| 1,867,451 | Gyr | July 12, 1932 |
| 1,958,327 | Winkler | May 8, 1934 |

FOREIGN PATENTS

| Number | Country | Date |
|---|---|---|
| 242,867 | Great Britain | Nov. 19, 1925 |

OTHER REFERENCES

Chemical Age Dictionary, 1924, pub. Ernest Benn Ltd., London.